(12) United States Patent
Claude et al.

(10) Patent No.: US 8,519,663 B2
(45) Date of Patent: Aug. 27, 2013

(54) POWER SUPPLY SYSTEM FOR AN ELEMENT, AMONG A ROTOR AND A STATOR OF AN ELECTRIC MACHINE, AND METHOD FOR CONTROLLING SUCH SYSTEM

(75) Inventors: Jean-Michel Claude, Felon (FR); Abdollah Mirzaian, Valdoie (FR); Matthieu Urbain, Belfort (FR)

(73) Assignee: Converteam Technology Ltd., Rugby (GB)

( * ) Notice: Subject to any disclaimer, the term of this patent is extended or adjusted under 35 U.S.C. 154(b) by 341 days.

(21) Appl. No.: 12/930,565

(22) Filed: Jan. 11, 2011

(65) Prior Publication Data

US 2011/0170218 A1    Jul. 14, 2011

(30) Foreign Application Priority Data

Jan. 13, 2010   (FR) ...................... 10 50207

(51) Int. Cl.
*H02P 27/04* (2006.01)
(52) U.S. Cl.
USPC .......... 318/800; 318/400.21; 318/45
(58) Field of Classification Search
USPC .......... 318/800, 45, 400.21, 376, 139, 809, 318/802, 803, 798, 814, 762
See application file for complete search history.

(56) References Cited

U.S. PATENT DOCUMENTS 5,912,813 A    6/1999   Kerkman et al. ............... 363/98
2012/0010771 A1*  1/2012   Kato et al. ...................... 701/22

FOREIGN PATENT DOCUMENTS

EP    1 995 860 A2    11/2008
GB    2 197 550 A    5/1988

* cited by examiner

*Primary Examiner* — Karen Masih
(74) *Attorney, Agent, or Firm* — Davidson, Davidson & Kappel, LLC

(57) ABSTRACT

A power supply system is provided. The power supply system includes a converter converting a direct input current into a polyphase alternating output current including a plurality M of phases. The converter includes two input terminals, is arranged at the input of the element and delivers the polyphase alternating current to element. The power supply system also includes a controller controlling the converter, a storage bank including at least one storage capacitor between the input terminals, a device protecting the element from over-voltages or over-currents of the polyphase alternating current, between the converter and element, including a plurality of switching arms between the respective phases of the polyphase alternating current. Each switching arm includes two thyristors connected head-to-tail and in parallel. The controller applies a negative voltage to the terminals of at least one thyristor during a period greater than a predetermined turn-off time of the thyristor.

16 Claims, 8 Drawing Sheets

POWER SUPPLY SYSTEM FOR AN ELEMENT, AMONG A ROTOR AND A STATOR OF AN ELECTRIC MACHINE, AND METHOD FOR CONTROLLING SUCH SYSTEM

This claims the benefit of French Patent Application FR 10 50207, filed Jan. 13, 2010 and hereby incorporated by reference herein.

The present invention relates to a power supply system for an element, among a rotor and a stator, of an electric machine, of the type comprising:

a converter for converting a direct input current into a polyphase alternating output current including a plurality M of phases, the converter comprising two input terminals, the converter being arranged at the input of said element and being adapted to deliver the polyphase alternating current to said element, control means for controlling the converter, a storage bank including at least one storage capacitor arranged between the input terminals of the converter, and a device for protecting the element from over-voltages and/or over-currents of said polyphase alternating current, arranged between the converter and said element, and including a plurality of switching arms arranged between the respective phases of the polyphase alternating current, each switching arm including two thyristors connected head-to-tail and in parallel.

The present invention also relates to an electric traction chain comprising an electric machine and such a power supply system for an element of the machine.

The invention also relates to a method for controlling such a power supply system.

In particular, the invention applies to hydroelectric power plants and wind turbines equipped with variable-speed electric machines and a power supply system of the electric machine. Such a power supply system has a high power, typically greater than 100 MW.

BACKGROUND

A power supply system of the aforementioned type is known. Each switching arm of the protective device also includes a resistance connected in series to two thyristors connected head-to-tail. The resistor makes it possible to reduce the over-currents of the rotor current and limit the oscillations of the engine torque. The maximum value of this resistance is chosen to avoid the conduction of the diodes of the rotor converter during the fault.

When an over-voltage or an over-current of the power current of the engine is detected, the thyristors of the protective device are placed and kept in conduction to short-circuit the element of the electric machine and thereby protect it from the over-voltage or over-current. The thyristors of the protective device are blocked, in order to eliminate the short-circuit at the terminals of the element of the electric machine to power said element again via the power supply system.

When a thyristor is on, the blocking of the thyristor only occurs when its current cancels itself out and its polarization voltage is negative. As a result, the duration necessary to block the thyristors of the protective device is important to pick up the control of the machine more quickly, due to the significant period of time necessary to dissipate the current in the resistor.

SUMMARY OF THE INVENTION

It is an object of the present invention to provide a power supply system making it possible to reduce the duration necessary to block the thyristors of the protective device in order to limit the period of time during which the element of the electric machine is not powered.

The present invention provides a power supply system of the aforementioned type, characterized in that the control means or controller for controlling the converter are able to apply a negative voltage to the terminals of at least one thyristor during a period greater than a predetermined turn-off time of said thyristor.

According to other embodiments, the power supply system comprises one or several of the following features, considered alone or according to all technically possible combinations:

each switching arm also includes two resistances, each one being connected in series to a respective thyristor;

the protective device includes M switching arms, each switching arm having one end connected to a respective phase and another end connected to a shared point, such that the switching arms are connected in a star to said shared point;

the protective device includes M-1 switching arms, each switching arm being connected between two successive phases;

all of the thyristors of the protective device are identical;

the voltage of the direct input current at the terminals of the storage bank is above 5000 V, preferably substantially equal to 8000 V;

the number M of phases is equal to three;

the system also comprises an alternating voltage transformer connected to an electric network via a sectioning device, and a voltage rectifier connected between the voltage transformer and the converter.

The invention also relates to an electric traction chain comprising an electric machine and a power supply system for an element among a rotor and a stator of the electric machine, characterized in that the power supply system is as defined above.

The invention also relates to a method for controlling a power supply system of an element, among a rotor and a stator, of an electric machine, the power supply system comprising:

a converter for converting a direct input current into a polyphase alternating output current including a plurality M of phases, the converter being arranged at the input of said element and able to deliver the polyphase alternating current to said element, the converter comprising a positive input terminal, a negative input terminal and M output terminals, the positive terminal being connected to the positive potential of the direct input current, the negative terminal being connected to the negative potential of the direct input current, each output terminal corresponding to a respective phase of the output current, control means or controller of the converter, a storage bank including at least one storage capacitor arranged between the input terminals of the converter, and a protective device for protecting the element from the over-voltages and/or over-currents of the polyphase alternating current, the protective device being arranged between the converter and said element, and including a plurality of switching arms arranged between the respective phases of the polyphase alternating current, each switching arm including two thyristors connected head-to-tail in parallel, each thyristor having a predetermined turn-off time, the method being characterized in that it comprises, for a single selected phase, the following steps:

calculating control signals of the converter according to a control law, the control law including:

a first connection period for connecting the output terminal of said selected phase to the positive input terminal, the other output terminals being connected to the negative input terminal, in order to impose a negative voltage on the terminals of a thyristor of the switching arm connected to the output terminal of said selected phase, the duration of the first period being greater than the turn-off time of said thyristor, and a second connection periods for connecting the output terminal of said selected phase to the negative input terminal, the other output terminals being connected to the positive input terminal, in order to impose a negative voltage on the terminals of the other thyristor of the switching arm connected to the output terminal of said selected phase, the duration of the second period being greater than the turn-off time of said other thyristor, applying the calculated control signals to the converter.

According to other embodiments, the control method comprises one or several of the following features, considered alone or according to all technically possible combinations:

the method comprises, for each of the M phases of the polyphase alternating current, the following steps:

said step for computing the control signals of the converter following the control law including the first connection period for connecting the output terminal of the respective phase to the positive input terminal, the other output terminals being connected to the negative input terminal, and the second connection period for connecting the output terminal of the respective phase to the negative input terminal, the other output terminals being connected to the positive input terminal, and said step for applying the computed control signals to the converter;

the storage bank comprising two storage capacitors arranged between the input terminals of the converter and connected to each other at a middle point, the middle point being connected to an electric ground on one hand and a reference terminal of the converter on the other hand, the other output terminals are connected to the negative input terminal or the reference terminal during the first period of the control law, and in which the other output terminals are connected to the positive input terminal or to the reference terminal during the second period of the control law;

the other output terminals are connected to the reference terminal during the first and second periods of the control law;

the turn-off time of each thyristor is between 300 μs and 700 μs, preferably equal to 500 μs.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
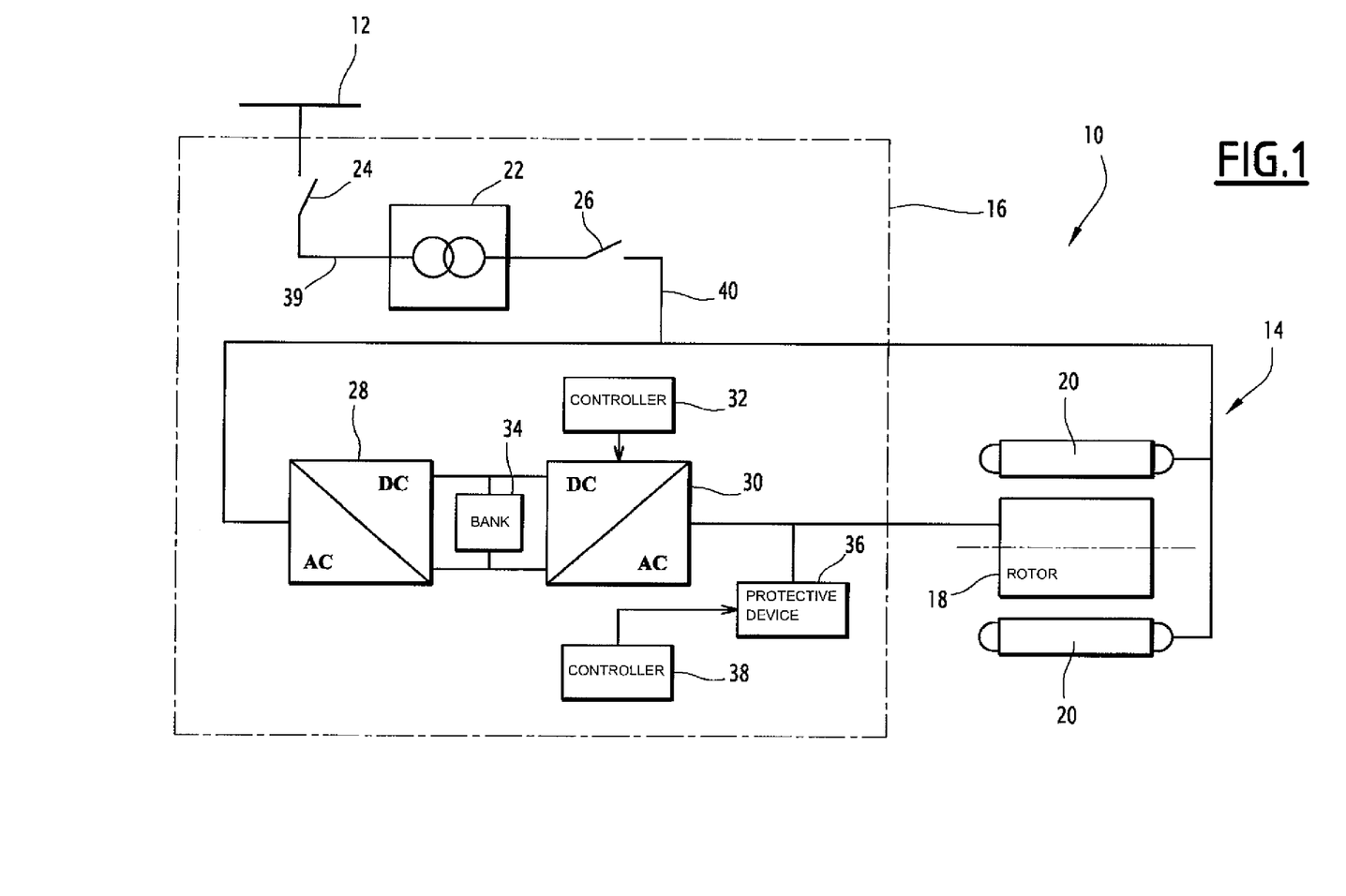
FIG. 1 is a diagrammatic illustration of a traction chain according to the invention, connected to an electric network.

In FIG. 1, an electric traction chain 10 is connected to an electric network 12. The electric network 12 is, for example, a three-phase alternating network with a high voltage, typically in the vicinity of 400 kV.

The electric traction chain 10 comprises an electric machine 14 and a power supply system 16 of the machine, connected to the electric network 12.

The electric machine 14 includes a rotor 18 and a stator 20, each comprising coils adapted to be powered by the power supply system 16. The electric machine 14 is, for example, a three-phase electric motor. The electric machine 14 has a nominal power with a value greater than 100 MW, e.g. equal to 275 MW.

The power supply system 16 comprises a voltage transformer 22 connected to the electric network 12 via a high-voltage sectioning device 24, and a low-voltage sectioning device 26 connected at the output of the voltage transformer 22.

The power supply system 16 also includes a voltage rectifier 28 connected at the output of the low-voltage sectioning device 26, a converter 30 for converting a direct input current into a polyphase alternating output current, the converter 30 being arranged at the output of the voltage rectifier 28 and able to deliver the polyphase alternating current to the rotor 18 of the electric machine.

The power supply system 16 also comprises a control means or controller 32 of the converter, a storage bank 34 arranged between the rectifier 28 and the inverter 30, a protective device 36 for protecting the rotor from over-voltages and/or over-currents of the polyphase alternating current, and a control means or controller 38 for controlling said protective device.

The voltage transformer 22 is adapted to transforming the high-voltage alternating current provided by the electric network 12 into a lower-voltage alternating current. More precisely, the voltage transformer 2 is able to deliver a current having a low voltage with a value, for example, equal to 15.75 kV from the high voltage of the electric network 12 with a value, for example, equal to 400 kV.

The high-voltage sectioning device 24 can be moved between an on position and an off position of a first electric connection 39 connecting the electric network 12 to the voltage transformer 22.

The high-voltage sectioning device 24 is able to cut the high-voltage current with a value, for example, equal to 400 kV circulating through the first electrical connection 39. The response time of the high-voltage sectioning device 24, corresponding to the time interval between the detection of an over-voltage or an over-current and the switching into the on position, is in the vicinity of 100 ms.

The medium-voltage sectioning device 26 can be moved between an on position and an off position of a second electrical connection 40 connecting the voltage transformer 22 to the rectifier 28, on one hand, and to the stator 20 of the electric machine, on the other hand. The medium-voltage sectioning device 26 can section the medium-voltage current with a value, for example, equal to 15.75 kV circulating through the second electrical connection 40. The response time of the low-voltage sectioning device 26 is in the vicinity of 100 ms.

The voltage rectifier 28 can convert the alternating current delivered by the voltage transformer 22 into a direct output current. The voltage of the direct output current delivered by the voltage rectifier 28 depends on the application and, for example, has a value greater than 5000 V, preferably substantially equal to 8000 V.

Figure 2:
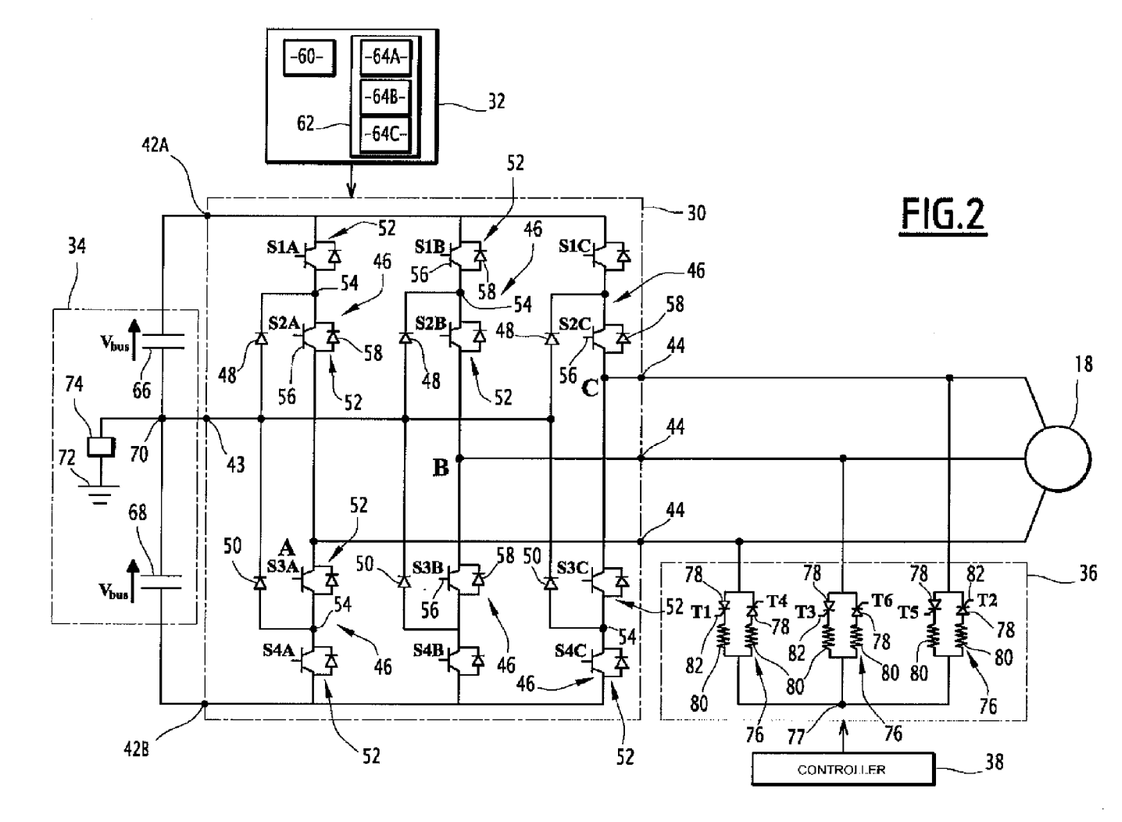
FIG. 2 is an electric diagram of a power supply system for a rotor of an electric machine of the traction chain of FIG. 1.

The converter 30 includes a positive input terminal 42A, a negative input terminal 42B, a reference terminal 43 and M output terminals 44. Each output terminal 44 corresponds to a respective phase of the polyphase alternating output current able to be delivered by the converter 30 and including a plurality M of phases, M being an integer. In the embodiment of FIG. 2, the number M of phases is equal to three.

In the embodiment of FIG. 2, the converter 30 is a three-phase inverter clamped by the neutral conductor. The inverter 30 comprises, for each output terminal 44 corresponding to a respective phase A, B, C, two switching arms 46, a first diode 48 and a second diode 50.

Each switching arm 46 is connected between the output terminal 44 of the corresponding phase A, B, C and a respective input terminal 42A, 42B. Each switching arm 46 comprises two electronic switches 52 connected serially and in the same direction, and connected to each other by a middle point 54. The four electronic switches 52 corresponding to the first phase A are noted S1A, S2A, S3A and S4A, respectively, from the positive terminal 42A to the negative terminal 42B. Similarly, the four electronic switches 52 corresponding to the second phase B, and the third phase C, respectively, are noted S1B, S2B, S3B, S4B, and S1C, S2C, S3C, S4C, respectively, from the positive terminal 42A to the negative terminal 42B.

Each diode 48, 50 is connected between the reference terminal 43 and a respective middle point 54. Each first diode 48 has its anode connected to the reference terminal 43 and its cathode connected to the respective middle point 54. Each second diode 50 has its anode connected to the respective middle point 54, and its cathode connected to the reference terminal 43.

Each electronic switch 52 is a two-way switch for current and one-way for voltage. Each electronic switch 52 comprises a transistor 56 and a diode 58 connected in anti-parallel thereby ensuring two-way current circulation paths when the transistor 56 is on. All of the electronic switches 52 are, for example, identical. The transistor 56 is, for example, an insulated gate bipolar transistor (IGBT). The gate of each transistor 56 is connected to the control means 32 to receive a corresponding control signal.

The control means 32 are each connected to electronic switches 52, as previously indicated, and are able to send control signals to said switches 52. The control means 32 include an information processing unit formed, for example, by a data processor 60 connected with a memory 62. The memory 62 is able to store software 64A for selecting an output terminal 44 to be successively connected to the positive terminal 42A, then to the negative terminal 42B, software 64B for computing control signals as a function of the selected output terminal, and software 64C for applying control signals to the converter 30.

Alternatively, the control means 32 are made in the form of programmable logic components or in the form of dedicated integrated circuits.

The storage bank 34 comprises a first capacitor 66 and a second capacitor 68 serially connected between the two input terminals 42A, 42B, and connected to each other by a middle point 70 connected to the reference terminal 43. The middle point 70 is connected to an electric ground 72 via a passive component 74.

Each capacitor 66, 68 has an identical voltage Vbus at its terminals. In other words, the positive terminal 42A has an electric potential equal to +Vbus relative to the electric ground 72, and the negative terminal 42B has a potential with values equal to −Vbus relative to the electric ground 72. The voltage of the direct current at the terminals of the storage bank 34 is equal to 2×Vbus, and is, for example, greater than 5000 V, preferably substantially equal to 8000 V. In other words, the value of the voltage Vbus is for example substantially equal to 4000 V.

The protective device 36 is arranged between the converter 30 and the rotor 18. The protective device 36 includes M switching arms 76 arranged between the respective phases of the polyphase alternating current delivered at the output of the converter 30. In the embodiment of FIG. 2, the protective device 36 includes three switching arms 76.

The protective device 36 is adapted to switching between an on position of the M switching arms and an off position of said M switching arms. In the on position of the protective device 36, the rotor 18 is normally powered by the inverter 30, and in the off position of said protective device 36, the rotor 18 is short circuited and thereby protected from over-voltages and/or over-currents of the polyphase alternating current.

In the embodiment of FIG. 2, each switching arm 76 has one end connected to a respective phase and another end connected to a shared point 77, such that all of the switching arms 76 are connected in a star to said shared point 77.

Each switching arm 76 includes two thyristors 78 connected head-to-tail and in parallel. Each switching arm 76 also includes two resistances 80, each being serially connected to a respective thyristor 78.

Each thyristor 78 includes a gate 82 connected to the control means 38 to receive a corresponding control signal. Each thyristor 78 has a turn-off time Tq and a holding current IH. The turn-off time Tq of each thyristor 78 corresponds to the minimum period during which the intensity of the anode current of the thyristor 78 must be lower than the intensity of the holding current IH to enable the blocking of the thyristor 78.

The turn-off time Tq and the holding current IH have specific values of the thyristor 78 used. The turn-off time Tq for example has a value between 300 µs and 700 µs, preferably equal to 500 µs. The holding current IH for example has a value substantially equal to 100 mA. All of the thyristors 78 of the protective device are identical and have a same turn-off time Tq and a same holding current IH.

In the embodiment of FIG. 2, the six thyristors 78 of the protective device are noted T1 to T6 in the order of their conduction during switching of the protective device 36 towards its off position.

Each resistance 80 is serially connected to a respective thyristor 78 and can create a negative voltage at the terminals of the other thyristor 78 of the switching arm, when it is passed through by a current, i.e. when the thyristor 78 with which it is arranged in a series is in conduction.

The control means 32 can control the converter 30 to apply a negative voltage to the terminals of at least one thyristor 78 during a period longer than the predetermined turn-off time Tq of said thyristor.

The control means 38 are each connected to thyristors 78, as previously indicated, and can send control signals to said thyristors 78. More specifically, the control means 38 can, on one hand, put and keep each respective thyristor 78 in conduction, and, on the other hand, block each respective thyristor 78 when the intensity of the anode current of the thyristor 78 is lower than the intensity of the holding current IH during a period longer than its turn-off time Tq. The control means 38 include an information processing unit formed, for example, by a data processor connected to a memory. The memory can store software for computing the control signals, and software for applying the control signals to the respective gate 82.

Alternatively, the control means 38 are made from programmable logic components or in the form of dedicated integrated circuits.

The operating of the power supply system 16 according to the invention will now be explained using FIGS. 3 to 9.

Figure 3:
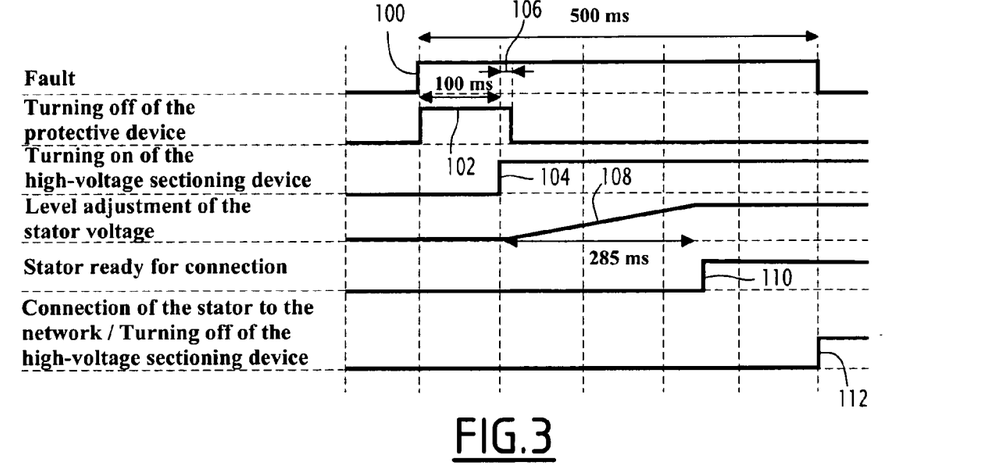
FIG. 3 is a timing diagram of different states of the traction chain of FIG. 1 during a fault on the electric network.

In FIG. 3, when a fault 100 is detected on the electric network 12, the control means 38 control the closing 102 of the protective device 36. The fault 100 is, for example, a voltage dip creating a voltage discontinuity and causing the appearances of over-currents.

The turning off 102 of the protective device is obtained by controlling the placement and maintenance in conduction of all of the thyristors 78 of the protective device in order to put the rotor 18 of the electric machine in short circuit and thereby protect it from an over-voltage or over-current resulting from the fault 100. The turning off 102 of the protective device is done quasi-instantaneously, and the rotor 18 and the converter 30 are therefore protected almost immediately after the appearance of the fault 100, whereas the high-voltage sectioning device 24 requires a period of about 100 ms to switch from its off position of the first connection 39 to its on position, the switching being shown by the pulse edge 104.

When the high-voltage sectioning device 24 is in the on position, the rotor 18 and the stator 20 of the electric machine are isolated from the electric network 12, and it is no longer necessary to keep the protective device 36 in the off position, the latter being adapted to ensure the protection of the rotor 18 transitionally between the appearance of the fault 100 and the effective turning on 104 of the high-voltage sectioning device.

A control method for controlling the power supply system is then implemented in order to switch the protective device 36 from its off position to its on position during a blocking phase 106. The blocking phase 106 has, according to the invention, a very short duration, depending on the turn-off time Tq of the thyristor. The duration of the blocking phase 106 is, for example, less than 30 ms, preferably equal to 22 ms.

The control method for controlling the power supply system 14 during the blocking phase 106 will be described in more detail hereinafter using FIG. 4.

When the protective device 36 is in the on position, a level adjustment phase 108 of the voltage at the terminals of the stator 20 is then provided. It is in fact necessary to ensure that the voltages upstream and downstream of the high-voltage sectioning device 24 are substantially of the same amplitude and in phase before switching the high-voltage sectioning device 24 from its on position to its off position, in order to avoid the appearance of over-currents when it is turned off. The level adjustment phase 108 has a duration substantially equal to 285 ms.

The voltage present in the stator terminals 20, during this level adjustment phase 108 and until the high-voltage sectioning device 24 is again in the off position, is a voltage caused at the voltage present at the terminals of the rotor 18. The rotor 18 is in fact powered via the inverter 30 and the storage bank 34 during the level adjustment phase 108 that follows the blocking phase 106.

When the fault has disappeared and the stator 20 is ready to be connected again to the electric network 12 (pulse edge 110), the high-voltage sectioning device 24 is then switched from its on position to its off position in order to again connect the power supply system 16 to the electric network 12 (pulse edge 112).

The control method of the power supply system 16 during the blocking phase 106 corresponding to the switching of the protective device 36 from its off position to its on position will now be described in more detail using FIG. 4.

The converter 30 is a three-level inverter, and is adapted to delivering, non-transitionally and for each of the M phases of the polyphase alternating current, an output voltage with a value equal to one level among three different voltage levels. In the embodiment of FIGS. 2 to 4, the three possible output voltage levels are +Vbus, 0, −Vbus, or for example +4 kV, 0 kV, −4 kV.

The control method comprises, for each of the M polyphase alternating current phases output from the converter 30, a step for computing control signals from the converter 30 following a control law, and a step for applying the calculated control signals to the converter 30 via the control means 32.

The control law includes, for each of the M phases of the polyphase alternating current, a first connection period for connecting the output terminal 44 of the respective phase to the positive input terminal 42A, the other output terminals 44 being connected to the negative input terminal 42B or the reference terminal 43, in order to impose a negative voltage on the terminals of a thyristor 78 of the switching arm 76 connected to the output terminal 44 of the respective phase. The duration of the first connection period is greater than the turn-off time Tq of said thyristor 78.

The control law includes, following this first connection period, a second connection period for connecting the output terminal 44 of said respective phase to the negative input terminal 42B, the other output terminals 44 being connected to the positive input terminal 42A or the reference terminal 43, in order to impose a negative voltage on the terminals of the other thyristor 78 of said switching arm 76 connected to the output terminal 44 of said respective phase. The duration of the second connection period is longer than the turn-off time Tq of said other thyristor 78.

The other output terminals 44 are preferably connected to the reference terminal 43 during the first and second periods of the control law for each of the M phases.

Figure 4:
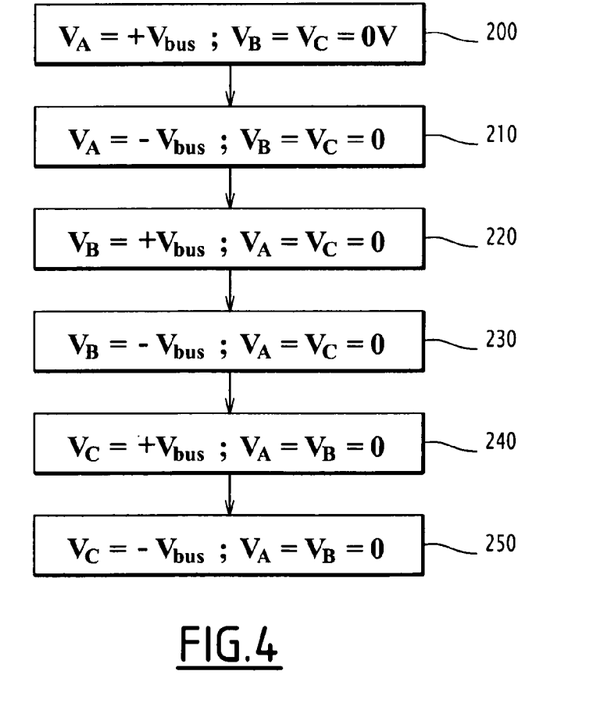
FIG. 4 is a flowchart showing a control method of the power supply system according to the invention.

In other words, in the embodiment of FIG. 4 for the three phases A, B, C of the three-phase current at the output of the converter 30, the control method includes a step 200 for connecting the output terminal 44 of the first phase A to the positive input terminal 42A, the other output terminals 44 of phases B and C being connected to the reference terminal 43. The positive input terminal 42A being connected to the potential +Vbus and the reference terminal 43 being connected to the zero potential, phase A has a potential +Vbus, and phases B and C have a zero potential relative to the electric ground 72 during step 200.

Step 200 thus corresponds, for the first phase A, to the step for computing the control signals according to the first period of the control law, followed by the step for applying said calculated control signals to the converter 30.

The method next includes a step 210 for connecting the output terminal 44 of phase A to the negative input terminal 42B, the other output terminals 44 of phases B and C being connected to the reference terminal 43. In other words, phase A is at potential −Vbus, and phases B and C are at the zero potential during step 210.

Step 210 thus corresponds, for the first phase A, to the step for computing the control signals from the converter 30 according to the second period of the control law, followed by the application of the computed control signals to the converter 30.

Similarly, the control method next includes a step 220 for connecting the output terminal 44 of phase B to the positive input terminal 42A, the other output terminals 44 of phases A and C being connected to the reference terminal 43. During the phase 220, phase B is therefore at potential +Vbus, and phases A and C are at zero potential.

Step 220 is then followed by a connecting step 230 for connecting the output terminal of phase B to the negative input terminal 42B, the other output terminals of phases A and C being connected to the reference terminal 43.

The control method lastly includes a step 240 for connecting the output terminal of phase C to the positive terminal 42A, the other output terminals of phases A and B being connected to the reference terminal 43, and a step 250 for connecting said output terminal of phase C to the negative input terminal 42B, the other output terminals of phases A and B being connected to the reference terminal 43.

Each of steps 200 to 250 has a duration longer than the turn-off time Tq of the thyristors 78, all identical.

Figure 5:
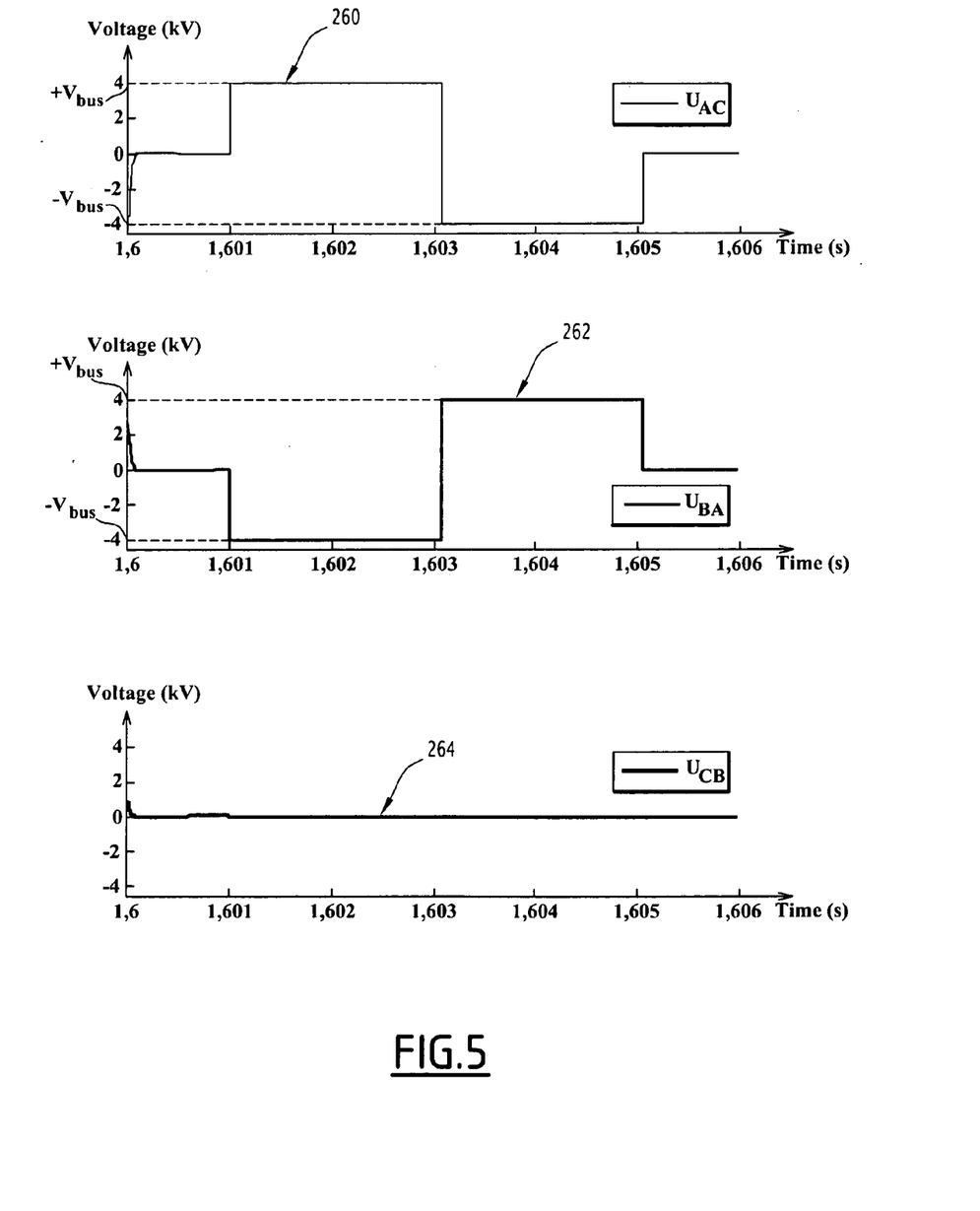
FIG. 5 is a set of curves showing, as a function of time, the respective voltages of the phases of the power current of the rotor during the blocking of thyristors of a protective device for protecting the power supply system of FIG. 2.

In FIG. 5, curves 260, 262, 264 respectively illustrate the voltages UAC, UBA, UCB between the respective phases A, B, C. More precisely, curves 260, 262, 264 illustrate the voltages between phases A, B, C during steps 200 and 210 corresponding respectively to the first and second connection periods for phase A. It is thus noted that step 200 takes place substantially between time moments 1.601 s and 1.603 s, the voltage UAC then being equal to +4 kV, or +Vbus, the voltage UBA being equal to −4 kV, or −Vbus, and the voltage UCB being substantially equal.

Step 210 next takes place substantially between time moments 1.603 s and 1.605 s, the voltage UAC then being equal to −Vbus, the voltage UBA being equal to +Vbus, and the voltage UCB still being zero.

The duration of steps 200 and 210 being substantially equal to 2 ms, and is therefore greater than the turn-off time Tq of the thyristors 78 with a value between 300 μs and 500 μs.

Figure 6:
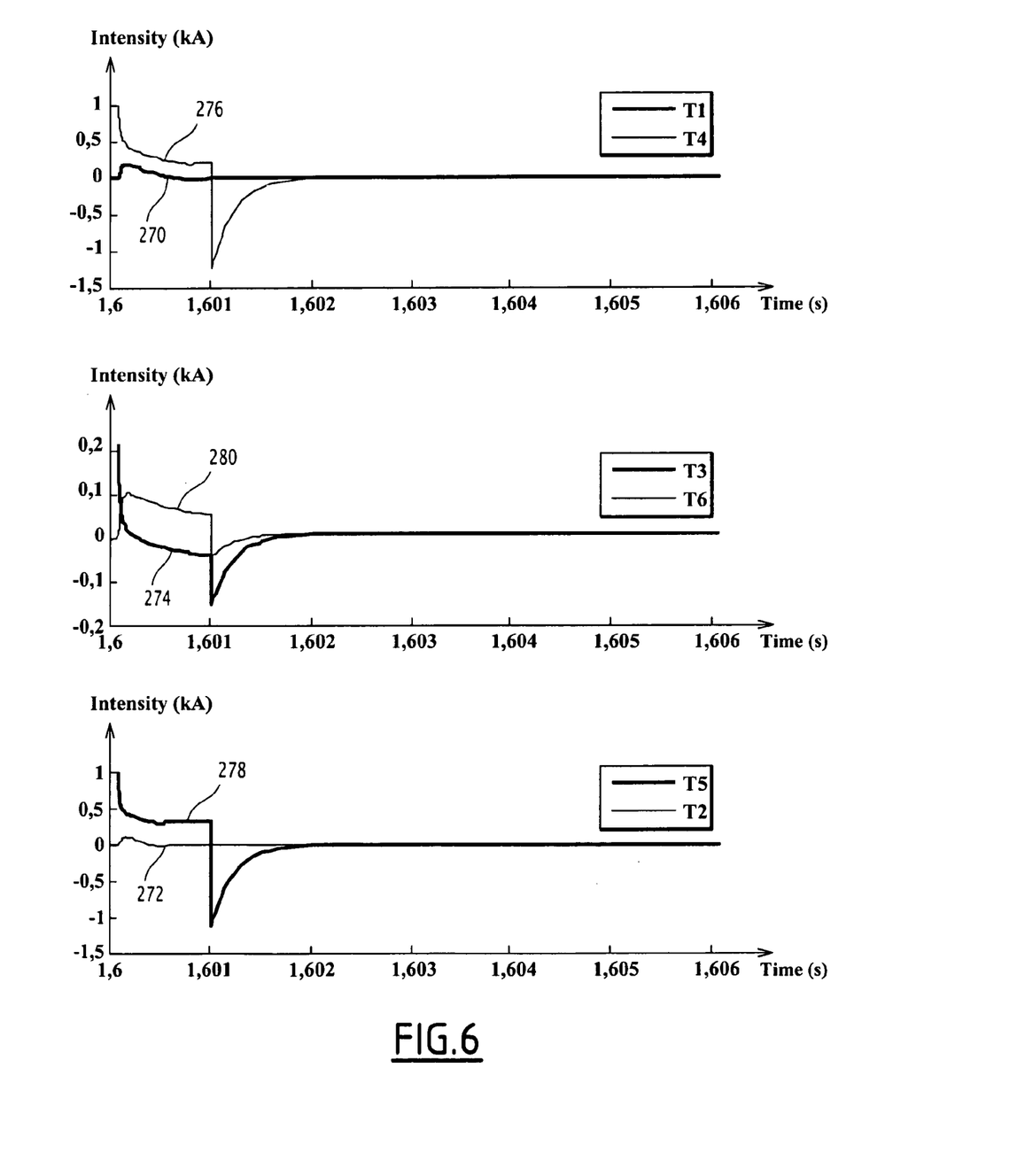
FIG. 6 is a set of curves showing, as a function of time, the respective intensities of the currents circulating in the respective thyristors of the protective device during blocking of the latter parts.

In FIG. 6, curves 270, 272, 274, 276, 278 and 280 illustrate the intensity of the current circulating through each of the respective thyristors T1 to T6.

Curves 274, 276 and 278 in particular show that the current circulating through the thyristors T3, T4 and T5 has a negative intensity peak for time moment 1,601 s corresponding to the beginning of step 200, the value of the intensity then decreasing in absolute value until time moment 1.602 s. The thyristors T3, T4 and T5 are therefore passed through by a current with a value below their holding current, for example equal to 100 mA, during a period longer than their turn-off time Tq, for example equal to 400 μs. In other words, step 200 for connecting phase A to the positive input terminal 42A, the other output terminals of phases B and C being connected to the reference terminal 43, causes the blocking of the thyristors T3, T4 and T5 in the embodiment of FIG. 6.

In the embodiment of FIG. 6, the thyristors T1 and T2 shown respectively by curves 270 and 272 were already blocked at moment 1.601 s corresponding to the beginning of the control method, such that the blocking of the thyristors T3, T4 and T5 due to the first connection period for connecting the output terminal of phase A to the positive terminal 42A also causes blocking of the last thyristor T6, the other thyristors T1 to T5 being blocked. Curve 280 illustrates the blocking of thyristor T6, a current with a negative intensity peak passing through the thyristor T6 for about 500 μs from time moment 1.601 s.

Figure 7:
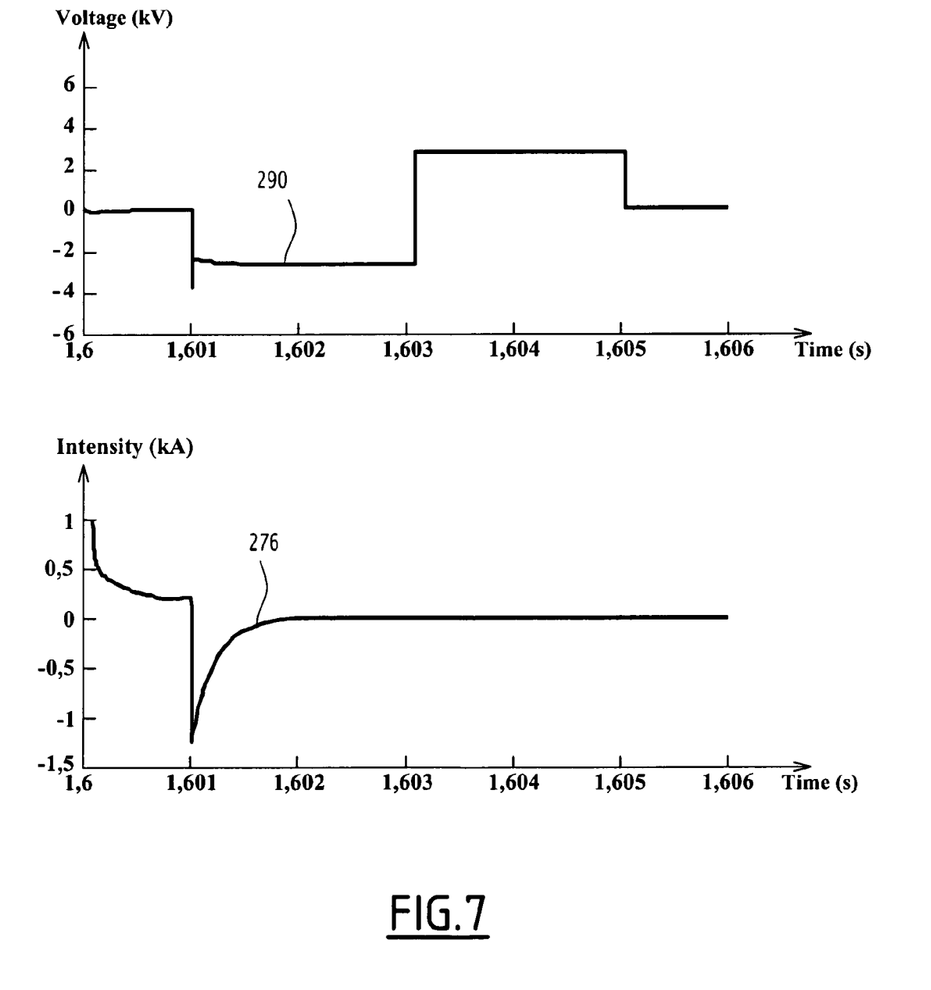
FIG. 7 is a set of curves showing the simultaneous evolution as a function of time of the voltage and intensity of a current circulating in a thyristor during blocking thereof.

In FIG. 7, curve 290 illustrates the voltage at the terminals of the thyristor T4 during steps 200 and 210. Curve 276, illustrating the intensity of the current circulating through the thyristor T4, is also illustrated in FIG. 7. Curves 276 and 290 then illustrate the forced blocking of the thyristor T4 by the negative voltage at its terminals and the reverse recovery current passing through it for a period longer than its turn-off time Tq.

During step 200, a positive current necessarily circulates through the thyristor T1, the voltage UAC being positive and the voltage UCB being zero, and creates a potential difference at the terminals of the resistance 80 serially connected to the thyristor T1. The thyristor T4 is therefore necessarily negatively polarized (FIG. 7) by the potential difference at the terminals of the resistance 80 serially connected to the thyristor T1, for a period longer than its turn-off time Tq, which causes forced blocking. Step 200 therefore necessarily creates the blocking of the thyristor T4.

Similarly, step 210 necessarily creates the blocking of the thyristor T1, phase A then being at potential −Vbus while phases B and C are at zero potential.

Also similarly, steps 220 and 230 necessarily create the blocking of thyristors T6 and T3, and steps 240 and 250 necessarily create the blocking of thyristors T2 and T5.

The control method then guarantees that the six thyristors T1 to T6 of the protective device 36 are blocked at the end of the blocking phase regardless of the state, i.e. conducting or blocked, in which each of the thyristors T1 to T6 was found.

The control method according to the invention thus allows the passage of the protective device 36 from its off position to its on position in a very short period of time, the duration of the blocking phase 106 being less than 30 ms.

The power supply system 16 according to the invention can thus make it possible to reduce the time necessary to block the thyristors 78 of the protective device, in order to limit the loss of time during which the rotor 18 of the electric machine is not powered.

Alternatively, the control method comprises, for a single selected phase, said step for computing the control signals of the converter 30 according to a control law and said step for applying the computed control signals to the converter 30.

The control law then includes a first connecting period for connecting the outlet terminal 44 of the selected phase to the positive input terminal 42A, the other output terminals 44 being connected to the negative input terminal 42B or the reference terminal 43, and a second connecting period for connecting said output terminal 44 of the selected phase to the negative input terminal 42B, the other output terminals 44 being connected to the positive input terminal 42A or to the reference terminal 43. The duration of the first and second periods is longer than the turn-off time Tq of the thyristors 78.

Indeed, it is sufficient to carry out said steps for computing the signals and applying the computed signals for a single phase selected in certain configurations of the protective device 36, in particular in the case where, before the blocking phase 106, all of the thyristors 78 of the protective device are in conduction.

Indeed, in the hypothesis where the thyristors T1 to T6 are in conduction at the beginning of the blocking phase 106, step 200 necessarily creates, for example, the blocking of thyristors T4, T3 and T5, since in this case a positive current necessarily circulates through thyristors T1, T6 and T2 by the polarization of phase A at potential +Vbus and phases B and C at zero potential. More specifically, the blocking of the thyristors T4, T3 and T5 is caused by the negative voltage at their terminals for a period longer than their turn-off time Tq by the current circulating through the resistances 80 in a series, thyristors T1, T6 and T2, respectively.

Similarly, step 210 in this case necessarily creates the blocking of the respective thyristors T1, T6 and T2, such that at the end of steps 200 and 210 relative to the selected phase A, all of the thyristors T1 to T6 are blocked.

It is thus possible for this alternative of the control method, during the blocking phase, to make it possible to reduce the duration necessary for blocking of the thyristors of the protective device.

Figure 8:
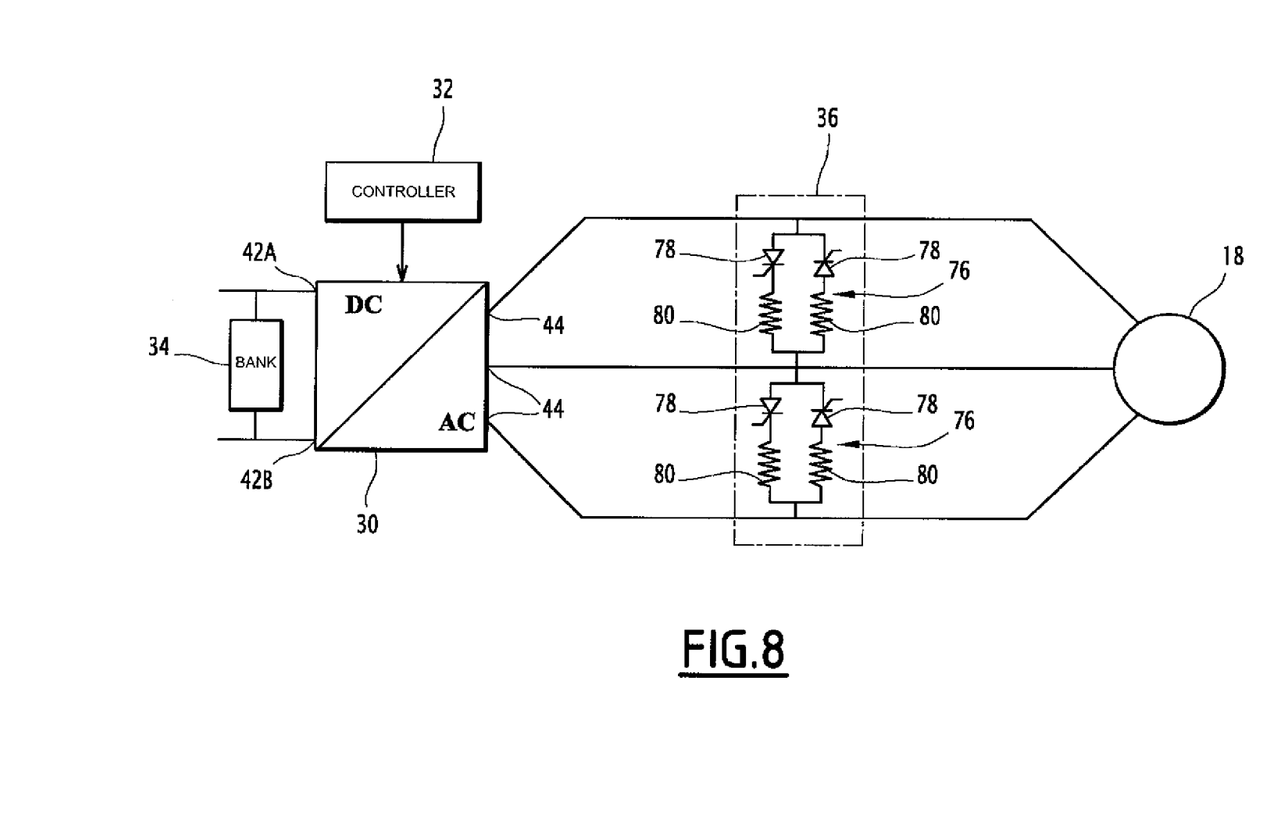
FIG. 8 is a diagrammatic illustration of the power supply system according to a second embodiment of the invention.

FIG. 8 illustrates a second embodiment, for which the elements similar to the first embodiment previously described are referenced using identical references.

According to the second embodiment, the protective device 36 comprises M-1 switching arms 76. This switching arm 76 is connected between two successive phases of the M phases of the three-phase alternating current delivered at the output of the converter 30, and the M-1 switching arms 76 are not connected at a shared point.

In the embodiment of FIG. 8, the number M of phases is equal to three, and the protective device 36 includes two switching arms 76.

Each switching arm 76 includes, as previously described, two thyristors 78 connected head-to-tail and in parallel, as well as two resistances 80. Each resistance 80 is connected in series to a respective thyristor 78. All of the thyristors 78 of the protective device are, for example, identical.

The operating of this second embodiment is similar to that of the first embodiment previously described, and is therefore not described again.

This second embodiment has the advantage of reducing production costs relative to the first embodiment previously described, since the protective device 36 includes four thyristors (instead of six thyristors in the first embodiment). However, this second embodiment creates, during the switching of the protective device from its off state to its on state, currents circulating in the converter 30 that have intensity peaks much greater than those of the currents circulating in the converter 30 of the first embodiment.

Figure 9:
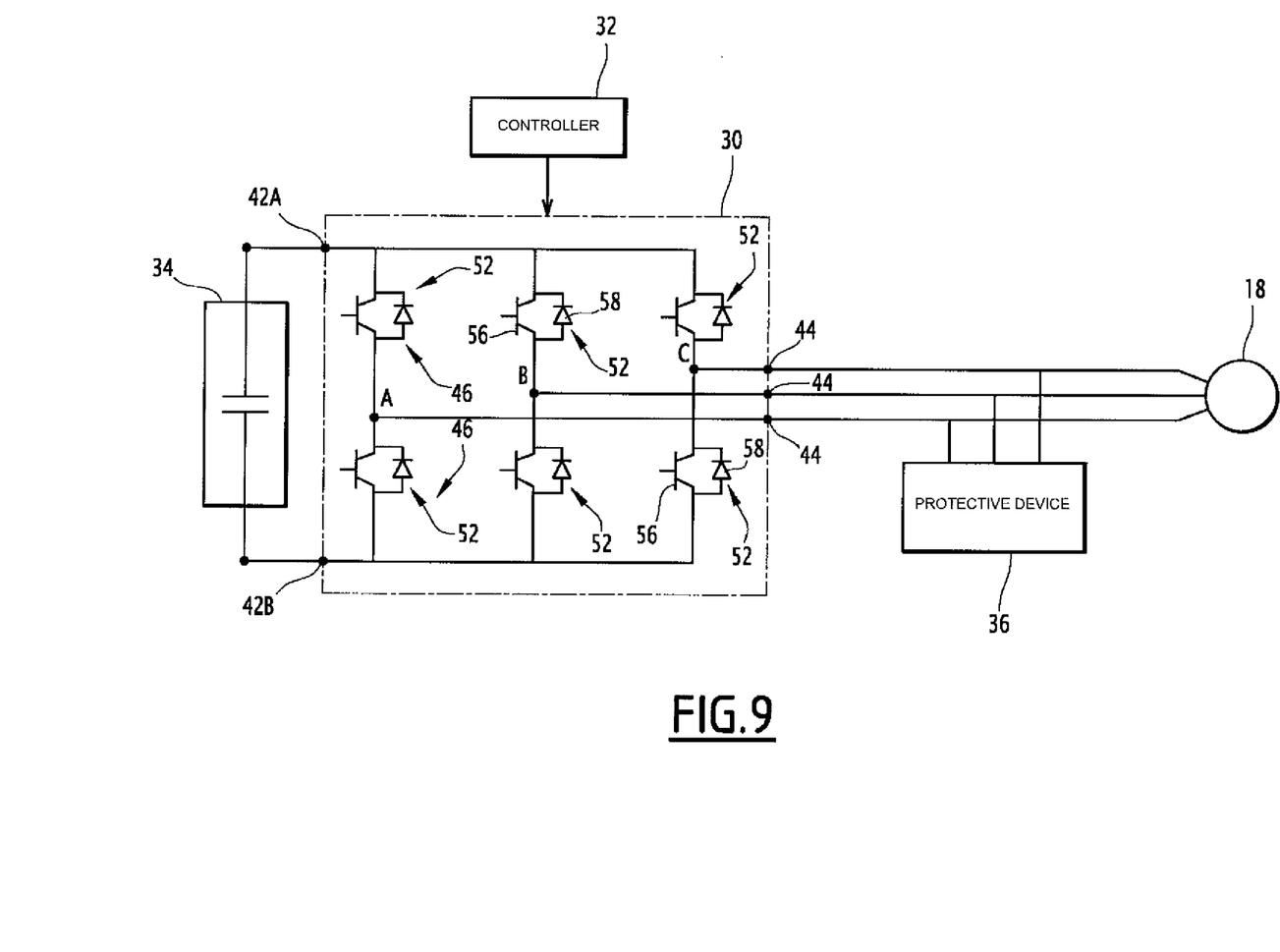
FIG. 9 is a view similar to that of FIG. 2 according to a third embodiment of the invention.

FIG. 9 illustrates a third embodiment, for which the elements similar to the embodiment previously described are referenced using identical references.

According to this third embodiment, the converter 30 is a bi-level inverter, and each switching arm 46 of the converter includes a single electronic switch 52. Each electronic switch 52 is, as previously described, a switch that is bidirectional in current and unidirectional in voltage, and comprises a transistor 56 and a diode 58 connected in anti-parallel. The transistor 56 is, for example, an IGBT transistor. The gate of each transistor 56 is connected to the control means 32 to receive the corresponding control signal.

The storage bank 34 includes a single capacitor connected between the positive terminal 42A and the negative terminal 42B.

The operating of this third embodiment is similar to that of the first embodiment previously described, and is therefore not described again in detail. When the output terminal 44 of the respective phase is connected to the positive terminal 42A during the first connection period, the other output terminals 44 are connected to the negative terminal 42B, and when the output terminal 44 of said respective phase is connected to the negative input terminal 42B during the second connection period, the other output terminals 44 are connected to the positive input terminal 42A.

The converter 30 is a bi-level inverter, and is adapted to delivering, non-transitionally and for each of the M phases of the polyphase alternating current, an output voltage with a value equal to one level among two different voltage levels. In the embodiment of FIG. 9, the two possible output voltage levels are +Vbus, −Vbus, or for example +4 kV, −4 kV.

The advantages of this third embodiment are similar to those of the first embodiment previously described, and are therefore not described again.

The power supply system according to the invention thus makes it possible to reduce the time necessary to block the thyristors of the protective device, in order to limit the time period during which the element of the electric machine is not powered.

The invention claimed is:

1. A power supply system for an element, among a rotor and a stator, of an electric machine, comprising:
a converter for converting a direct input current into a polyphase alternating output current including a plurality M of phases, the converter comprising two input terminals, the converter being arranged at an input of said element and being adapted to deliver the polyphase alternating current to said element,
a controller for controlling the converter,
a storage bank including at least one storage capacitor arranged between the input terminals of the converter, and
a protection device for protecting the element from overvoltages and/or over-currents of said polyphase alternating current, arranged between the converter and said element, and including a plurality of switching arms arranged between the respective phases of the polyphase alternating current, each switching arm including two thyristors connected head-to-tail and in parallel,
the controller capable of applying a negative voltage to terminals of at least one of the two thyristors during a period greater than a predetermined turn-off time of the at least one thyristor.

2. The system according to claim 1 wherein each switching arm also includes two resistors, each one being connected in series to a respective thyristor.

3. The system according to claim 1 wherein the protection device includes M switching arms, each switching arm having one end connected to a respective phase and another end connect to a shared point, such that the switching arms are connected in a star to said shared point.

4. The system according to claim 1 wherein the protection device includes M-1 switching arms, each switching arm being connected between two successive phases.

5. The system according to claim 1 wherein all of the thyristors of the protection device are identical.

6. The system according to claim 1 wherein a voltage of the direct input current at the terminals of the storage bank is above 5000 V.

7. The system as recited in claim 6 wherein the voltage is substantially equal to 8000 V.

8. The system according to claim 1 wherein the number M of phases is equal to three.

9. The system according to claim 1 further comprising an alternating voltage transformer connected to an electric network via a sectioning device, and a voltage rectifier connected between the voltage transformer and the converter.

10. An electric traction chain comprising:
an electric machine and a power supply system for a rotor of the electric machine, the power supply system being according to claim 1 and adapted to power the rotor of the electric machine, the rotor being connected at the output of the converter.

11. A control method for controlling a power supply system of an element, among a rotor and a stator, of an electric machine, the power supply system comprising:

- a direct input current converter and a polyphase alternating output current including a plurality M of phases, the converter being arranged at the input of said element and able to deliver the polyphase alternating current to said element, the converter comprising a positive input terminal, a negative input terminal and M output terminals, the positive terminal being connected to the positive potential of the direct input current, the negative terminal being connected to the negative potential of the direct input current, each output terminal corresponding to a respective phase of the output current,
- a controller of the converter,
- a storage bank including at least one storage capacitor arranged between the input terminals of the converter, and
- a protection device for protecting the element from the over-voltages and/or over-currents of the polyphase alternating current, the protection device being arranged between the converter and said element, and including a plurality of switching arms arranged between the respective phases of the polyphase alternating current, each switching arm including two thyristors connected head-to-tail in parallel, each thyristor having a predetermined turn-off time, the method comprising, for a single selected phase, the following steps:

calculating control signals of the converter according to a control law, the control law including:

- a first connection period for connecting the output terminal of said selected phase to the positive input terminal, the other output terminals being connected to the negative input terminal, in order to impose a negative voltage on the terminals of a thyristor of the switching arm connected to the output terminal of said selected phase, the duration of the first period being greater than the turn-off time of said thyristor, and
- a second connection period for connecting the output terminal of said selected phase to the negative input terminal, the other output terminals being connected to the positive input terminal, in order to impose a negative voltage on the terminals of the other thyristor of the switching arm connected to the output terminal of said selected phase, the duration of the second period being greater than the turn-off time of said other thyristor; and applying the calculated control signals to the converter.

12. The control method according to claim 11 comprising, for each of the M phases of the polyphase alternating current, the following steps:

said step for computing the control signals of the converter following the control law including the first connection period for connecting the output terminal of the respective phase to the positive input terminal, the other output terminals being connected to the negative input terminal, and the second connection period for connecting the output terminal of the respective phase to the negative input terminal, the other output terminals being connected to the positive input terminal, and;

said step for applying the computed control signals to the converter.

13. The control method according to claim 11 wherein the storage bank comprising two storage capacitors arranged between the input terminals of the converter and connected to each other at a middle point, the middle point being connected to an electric ground on one hand and a reference terminal of the converter on the other hand, the method including that the other output terminals are connected to the negative input terminal or the reference terminal during the first period of the control law, and the other output terminals are connected to the positive input terminal or to the reference terminal during the second period of the control law.

14. The control method according to claim 13 wherein the other output terminals are connected to the reference terminal during the first and second periods of the control law.

15. The control method according to claim 12 wherein the turn-off time of each thyristor is between 300 µs and 700 µs.

16. The control method as recited in claim 15 wherein the turn-off time of each thyristor is equal to 500 µs.

* * * * *